United States Patent [19]

Stodt

[11] Patent Number: 4,802,564

[45] Date of Patent: Feb. 7, 1989

[54] FRICTION-DISC CLUTCH

[75] Inventor: Enno Stodt, Heidenheim, Fed. Rep. of Germany

[73] Assignee: J. M. Voith GmbH, Fed. Rep. of Germany

[21] Appl. No.: 90,254

[22] PCT Filed: Nov. 26, 1986

[86] PCT No.: PCT/EP86/00685

§ 371 Date: Jul. 22, 1987

§ 102(e) Date: Jul. 22, 1987

[87] PCT Pub. No.: WO87/03348

PCT Pub. Date: Jun. 4, 1987

[30] Foreign Application Priority Data

Nov. 26, 1985 [DE] Fed. Rep. of Germany ....... 3541755

[51] Int. Cl.$^4$ ..................... F16D 13/69; F16D 13/72
[52] U.S. Cl. ................... 192/70.28; 192/70.12; 192/85 AA; 192/113 B; 188/71.5
[58] Field of Search ............ 192/70.12, 70.28, 85 AA, 192/113 B; 188/71.5, 72.3

[56] References Cited

U.S. PATENT DOCUMENTS

| | | | |
|---|---|---|---|
| 2,174,240 | 9/1939 | Glenney | 192/70.28 |
| 2,540,965 | 2/1951 | Schellinger | 192/70.21 |
| 2,738,864 | 3/1956 | Becker | 192/70.14 |
| 3,291,273 | 12/1966 | Hansen | 192/85 AA |
| 3,397,761 | 8/1968 | Lindquist | 192/107 C |
| 3,666,062 | 5/1972 | Riese | 192/70.28 |
| 4,548,306 | 10/1985 | Hartz | 192/70.28 |

FOREIGN PATENT DOCUMENTS

| | | |
|---|---|---|
| 646120 | 6/1937 | Fed. Rep. of Germany ... 192/70.28 |
| 823082 | 11/1951 | Fed. Rep. of Germany . |
| 1291578 | 3/1969 | Fed. Rep. of Germany . |
| 2601507 | 2/1979 | Fed. Rep. of Germany . |
| 3320977 | 12/1984 | Fed. Rep. of Germany . |
| 280607 | 5/1952 | Switzerland . |
| 955852 | 4/1964 | United Kingdom . |

Primary Examiner—Rodney H. Bonck
Assistant Examiner—David A. Testardi
Attorney, Agent, or Firm—Ostrolenk, Faber Gerb & Soffen

[57] ABSTRACT

A friction disc clutch including a first clutch half with radially inwardly extending outer friction plates and a second clutch half with radially outwardly extending inner friction plates interleaved with the outer friction plates. Friction material on the axially outwardly facing surfaces of the inner friction plates engage the opposing surfaces of the outer friction plates on engagement of the clutch halves. A respective Belleville spring between an inner friction plate and the next adjacent outer friction plate normally urges those plates apart sufficiently that it prevents mutual engagement of the friction plates through internal friction of the fluid in the clutch. The Belleville springs have radially external borders which connect with the outer friction plates and rotate with them and have internal borders which abut against but slide over the inner friction plates.

15 Claims, 2 Drawing Sheets

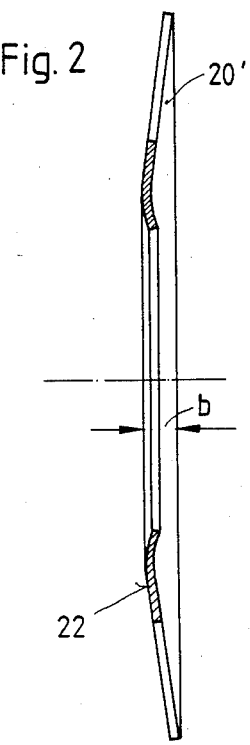
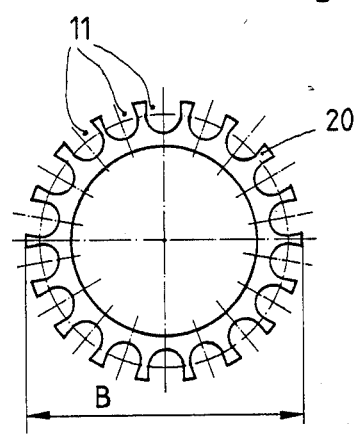
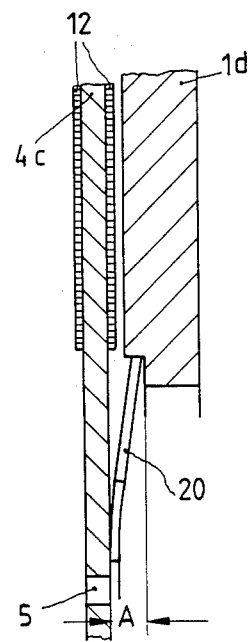

FRICTION-DISC CLUTCH

BACKGROUND OF THE INVENTION

The invention relates to a friction-disc clutch and more particularly to means which cooperate with the friction plates of the clutch halves for holding them apart on clutch disengagement. The invention is particularly used in the context of a wet friction disc clutch, that is, one in which oil is present between the friction plates.

In disengaged condition, the friction plates of wet friction-disc clutches connected with the driving shaft tend to drag the friction plates connected with the driven shaft. This is due to the existence of an oil film between the friction plates transmitting an undesirable residual torque between driving shaft and driven shaft. In order to reduce this torque, the friction discs have been given a semisoidally-shaped profile ensuring disconnection of the entire friction-disc package during disengagement by means of its inherent springiness.

Another method known from DE-PS No. 823 082 is to insert expansion elements between the outer friction plates rotatably fast with the clutch cage or between the inner friction plates torsionally connected with the hub which spread the friction plates of the outer package or those of the inner package when the clutch is disengaged, thus preventing them from sticking to the plates of the other package. As only one of the friction plate packages is spread by the ring-shaped expansion elements coated on both sides with a resilient, oil-resistant material, however, the non-spread friction plates of the other package in between can still stick to the friction plate surfaces of the spread package and transmit a friction torque. Another method known (e.g. from DE-AS No. 26 01 507) is to provide expansion elements both between the friction plates of the inner package and between those of the outer package so That each friction plate package is spread separately. However, this method cannot reliably prevent either sticking of one friction plate package to the other on one side or transmission of a friction torque. A variant of this solution described in DE-PS No. 33 20 977 involves a set of spring leaves pressing the outer friction plates in one direction and another set of spring leaves pressing the inner friction plates in the opposite direction so that during disengagement of the clutch the outer and inner friction plates are separated from each other. The spring leaves, however, have to be so designed that the outer and inner friction plates separated on one side are not pressed together on the other. Moreover, the spring leaves require a considerable expenditure.

U.S. Pat. No. 3,397,761 illustrates another known friction-disc clutch having only one inner friction disc (as second clutch half). For optimum separation of the two halves there are used resilient expansion elements, each of which is in contact with the inner friction plate on one hand and with an element of the first clutch half on the other hand. The expansion elements are attached to the inner friction plate. They are located at a comparatively great distance from the rotational axis of the clutch near the inner radial end of the friction surfaces. Due to this arrangement, they still produce a relatively great friction torque when sliding over the components of the first clutch half in disengaged condition. Moreover, they are liable to premature wear.

SUMMARY OF THE INVENTION

The object of the invention is to provide a wet friction-disc clutch wherein there is no substantial residual torque remaining in the released condition, neither due to the sticking of the friction surfaces together as a consequence of the fluid film between the friction plates nor due to the expansion members used to separate the friction surfaces from each other.

In addition to the spring which is intended to disengage the clutch, and also by separating the furthermost outer friction plates, for example, there are individual resilient disengaging members between each adjacent pair of an outer friction surface and an inner friction surface, and these disengaging members separate their respective pairs of surfaces. The outer and inner friction surfaces from the first and second clutch halves, respectively, are interleaved and therefore alternate. The invention is based on a friction-disc clutch comprising resilient disengaging members for spreading the friction surfaces apart, each of said disengaging members being in contact with the inner friction plate (i.e. the second clutch half) on one side and with an element of the first clutch half on the other. A prerequisite is that there is at least one such disengaging member for each pair of friction surfaces so that during disengagement of the clutch all surface pairs are spread apart and released. A further prerequisite is that in addition to a first actuating member for clutch engagement there is provided a second actuating element acting in the opposite direction for release of the clutch. When the clutch is disengaged, the first actuating member is thus returned to its initial position by the second actuating member and not by the disengaging members. The only function of the resilient disengaging members therefore is to fully detach the friction surface pairs from each other after the clutch has been released. Said disengaging members can therefore be dimensioned for smaller loads, a measure which already in itself contributes to a reduction of drag torque in so far as this is caused by sliding of the disengaging members. (The aforementioned actuating members can be of different or identical design or can be designed as one double-acting element, e.g. a double-acting cylinder/piston assembly.) The use of Belleville springs as resilient disengaging members according to the invention now offers a further substantial reduction in that part of drag torque attributable to sliding of the disengaging members when the clutch is released. A friction-disc clutch using Belleville springs as resilient disengaging members is known already from GB-PS No. 955,852. However, the Belleville springs of this type only act on the inner friction plates on both sides so that a complete separation and disengagement of the friction surfaces cannot be guaranteed. In the case of the present invention, in contrast, each Belleville spring abuts with its outer radial edge against an element of the first clutch half and with its inner radial edge against the inner friction plate or one of the inner friction plates, i.e. against an element of the second clutch half, whereby it is essential that the outer radial edge of each Belleville spring contacts the first clutch half positively or frictionally in such a way that the Belleville spring mostly rotates together with the first clutch half. This means that there is no difference or only a slight difference in rotational speed between each Belleville spring and the first clutch half when the clutch is disengaged. Hence, the unavoidable speed difference exists only, or at least mainly, at the inner radial edge of the Belleville springs which, according to this invention, is provided with a sliding surface abutting against the inner friction plate. The unavoidable sliding movement therefore takes place at a much shorter distance from the rotational axis of the clutch than has been the case with prior art. The friction torque resulting from this sliding movement is thus considerably reduced.

To facilitate manufacture and assembly of the friction-disc clutch according to the invention, a frictionally engaged connection is preferred for the contact area between the outer edge of each Belleville spring and the first clutch half. This is provided by a respective cylindrical centering surface being provided on one of the outer friction plates of the first clutch half and by the radially outer border region of the respective Belleville spring for that outer friction plate resting on the cylindrical surface. Further, the inner diameter of the centering surface is slightly smaller than the outer diameter of the Belleville spring before the insertion of the Belleville spring into the centering surface. Finally, it is helpful if the Belleville spring has radial slots extending radially inwardly from the external periphery of the Belleville spring. Other features serve mainly for further reducing the friction torque resulting from the difference in speed between the Belleville springs and the inner friction plate or inner friction plates when the clutch is disengaged. These other features include providing the sliding surface at the inner border of the Belleville spring to be curved toward the respective inner friction plate which that Belleville spring engages. Additionally, the inner friction plate has a splined connection with the hub on the shaft with which the inner friction plate rotates. That spine connection has a radial safety clearance. Preferably, the inner diameter of the centering surface is smaller than the diameter of the radially inner edge of the respective friction surface between the inner and outer friction plates acted upon by the respective Belleville spring. Finally, the axial length of the Belleville spring in its nontensioned condition is substantially identical to the distance between the respective abutting surfaces on the inner and outer friction plates for the Belleville spring when the inner and outer friction plates and therefore the first and second clutch halves are disengaged.

Possible embodiments of the invention are explained below on the basis of schematic drawings.

BRIEF DESCRIPTION OF THE DRAWINGS

FIG. 2 is a sectional view of one of the Belleville springs.

FIG. 3 is a reduced plan view of one of the Belleville springs.

FIG. 4 is a detail of the clutch shown in FIG. 1 in released condition.

DESCRIPTION OF PREFERRED EMBODIMENT

Figure 1:
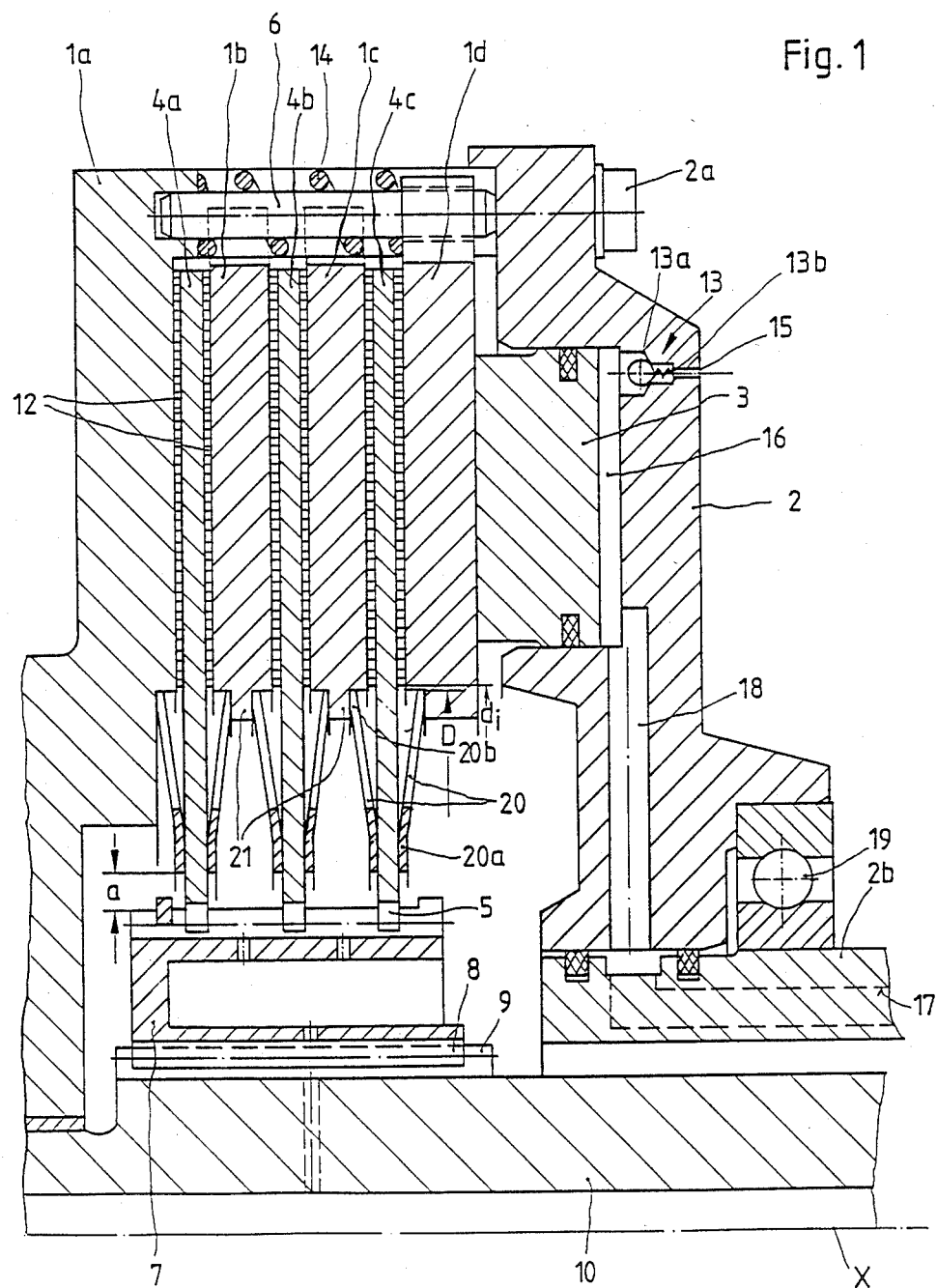
FIG. 1 shows half of a friction-disc clutch with disengaging members in the form of annular Belleville springs.

The friction-disc clutch shown in FIG. 1 consists of one first clutch half and one second clutch half. The components of the first clutch half are a clutch housing 1a and three outer friction plates 1b to 1d connected with clutch housing 1a by their peripheral circumference in a rotatably fast but axially slidable manner. A number of circumferentially spaced axial pins 6 provides guidance for compression springs 14 which press clutch housing 1a and the outmost outer friction plate 1d apart. A support ring 2 is connected with clutch housing 1a by means of bolts 2a and supported by a fixed bearing neck 2b via an anti-friction bearing 19. The bearing neck may be part, for instance of a transmission housing.

The elements of the second clutch half are three inner friction plates 4a, 4b, and 4c, each of which is interposed between two elements 1a to 1d of the first clutch half. The inner circumference of inner friction plates 4a to 4c is provided with teeth 5 engaging with the external splines of a hub 7. Via further splines 8, 9, this hub is non-rotatably but axially slidably mounted on a shaft 10 which can for instance be the input shaft of a transmission.

The support ring 2 has a ring-shaped cylinder chamber 16 accommodating an annular piston 3. By applying a pressure medium through passages 17 and 18 to cylinder chamber 16, annular piston 3 can be made to press the friction plates against each other and against clutch housing 1a, thereby engaging the friction-disc clutch. The engaged clutch is shown in FIG. 1.

A drain passage 15 connects cylinder chamber 16 to the atmosphere. An automatic drain valve 13 is located in this passage. As long as the friction-disc clutch is held in engaged condition by the pressure in cylinder chamber 16, a movable valve body (e.g. ball 13a) keeps drain valve 13 closed so that the pressure medium connot escape. When passages 17 and 18 and cylinder chamber 16 are relieved of pressure, drain valve 13 opens, e.g. due to the pressure exerted by a spring 13b or due to the centrifugal force acting on valve body 13a. This permits cylinder chamber 16 to be rapidly drained, allowing compression springs 14 to rapidly shift outer friction plate 1d and annular piston 3 (to the right in the case of the arrangement shown in FIG. 1).

Friction linings 12 are attached to both sides of inner friction plates 4a, 4b, and 4c, for example, these linings being schematically shown in the drawing by hatching parallel to the axis. In disengaged condition of the friction-disc clutch, these friction linings 12 shall be detached as completely as possible from elements 1a to 1d of the first clutch half, with which they are in contact when the clutch is engaged. This is accomplished by resilient disengaging means 20 taking the form of special Belleville springs arranged concentric with the axis of rotation X of the clutch. Each of these Belleville springs 20 has a radially inner border area 20a and a radially outer border area 20b. With the radially inner border area 20a it abuts one of the inner friction discs (e.g. 4a) and with the outer border area 20b one of the components forming the first clutch half, e.g. the outer friction disc 1b. The contact surfaces for Belleville springs 20 on elements 1a to 1d of the first clutch half are all located in the radially inward area of the first clutch half or, in other words, radially inward of friction linings 12. Each of the outer friction plates 1b to 1d, which are thicker than the inner friction plates 4a to 4c, has a projection 21 on the radial inside defining the contact surface for Belleville springs 20.

In order that the Belleville springs 20 rotate always (or at least mostly) together with elements 1a to 1d of the first clutch half, the invention proposes to provide cylindrical centring surfaces of an inner diameter D for Belleville springs 20 on each of the elements 1a to 1d. This diameter D is the same as, or slightly smaller than, the external diameter B of the relieved Belleville springs, i.e. of the springs before their insertion into the centering surface; see FIGS. 2 and 3. It is thus ensured that Belleville springs 20 always rotate with a speed which comes at least close to the speed of the first clutch half also when the friciton-disc clutch is released. A sliding motion therefore takes place only or mainly on the inner border area 20a, i.e. on the surface where Belleville springs 20 abut against inner friction plates 4a to 4c. There is a safety clearance a between the radially inner edge of each Belleville spring and the external splines of the hub 7.

As can best be seen from FIG. 3, the Belleville springs 20 have slots 11 extending from the radially outer edge 20b in a direction towards inner edge 20a. An important feature is that contrary to commercial Belleville springs, the inner border 20a of each spring 20 according to the present invention has a sliding surface intended to prevent wear of the mating surfaces of inner friction plates 4a-4c. The sliding surfaces of springs 20 can be substantially plane as shown in FIG. 1. As an alternative, Belleville springs 20' can also have a sliding surface 22 which is curved towards the inner friction plate according to FIG. 2.

FIG. 4 shows one of the inner friction plates 4c with its friction linings 12, the corresponding outer friction plate 1d on which it acts, and the Belleville spring 20 arranged between these two components. The components are shown in released condition of the friction-disc clutch, since there is a clear gap between the two friction plates 1d and 4c. In this condition, the distance A between the contact surfaces on the friction plate sides for Belleville springs 20 is greater than in FIG. 1. The Belleville spring is in this condition totally or almost totally relieved. In other words: before installation, the axial length b of Belleville spring 20 or 20' (see FIG. 2) is substantially the same as the aforementioned distance A between the abutment surfaces of the friction plates (e.g. 1d and 4c).

Due to the above measure, the Belleville spring exerts only a negligible residual spring force, if any, on the inner friction plate when the clutch is disengaged. Since in addition to this the contact area between spring 20 and the inner friction plate is very small thanks to the measures above described and since it is furthermore located close to the rotational axis X of the clutch, the drag torque transmitted by Belleville springs 20 is negligible. The friction-disc clutch described in this invention is therefore especially suitable for vehicle drives with synchronized mechanical gearbox where gearchanges may only be effected after as complete a disconnection from the engine or drive motor as possible.

I claim:

1. A friction-disc clutch comprising a first clutch half and a second clutch half which cooperate for engaging to transmit torque and for disengaging;
   (a) the first clutch half comprising a clutch housing; a rotatable shaft within the clutch housing for being drivingly connected to and disconnected from the clutch housing;
   an outer friction plate extending around the shaft; the outer friction plate having an outer circumference that is connected with the clutch housing in a rotatably fast manner and in a manner permitting relative axial sliding of the outer friction plate with respect to the clutch housing; the outer friction plate having a first axial side;
   (b) the second clutch half comprising an inner friction plate extending around the shaft; the inner friction plate having a second axial side; the inner friction plate having an inner circumference; connection means between the inner circumference of the inner friction plate and the shaft for connecting them rotatably fast while permitting axial sliding of the inner friction plate with respect to the shaft;
   (c) the inner friction plate extending radially outwardly and being located axially alongside the outer friction plate; a friction surface being disposed on the second axial side of the inner friction plate which is opposite the first axial side of the adjacent outer friction plate, such that the friction surface on the inner friction plate may contact the first axial side of the outer friction plate when the first and second clutch halves are engaged;
   (d) a first actuating element operating upon the outer and inner friction plates to move them into engagement for engaging the clutch; a second actuating element operable for moving the outer and inner friction plates axially apart for disengaging the clutch;
   (e) a respective resilient disengaging member extending around the shaft and being disposed between the adjacent inner and outer friction plates; the disengaging member having a third axial side for acting upon the inner friction plate and a fourth opposite axial side for acting upon the adjacent outer friction plate for normally urging the friction surface of the inner friction plate off the first axial side of the outer friction plate;
   (f) the disengaging member comprising a Belleville spring around the shaft, the spring being annular and having a radially outer border, and the Belleville spring being shaped and of a diameter such that the radially outer border abuts against a radially inner area, near the inner circumference, of the outer friction plate of the first clutch half;
   (g) the outer border of the Belleville spring engaging and rotating at least mostly together with the outer friction plate of the first clutch half;
   (h) the Belleville spring having a radially inner border which is spaced radially outwardly from the shaft and abutting against the respective inner friction plate, the radially inner border of the Belleville spring having a sliding surface for sliding over a surface of the inner friction plate, whereby the Belleville spring rotates at least mostly together with the first clutch half.

2. The friction disc clutch of claim 1, wherein the radially inner area of the outer friction plate near the inner circumference thereof has a generally cylindrical centering surface, and the radially outer border of the Belleville spring contacts the respective outer friction plate at the cylindrical centering surface.

3. The friction disc clutch of claim 2, wherein the Belleville spring has radial slots extending radially inwardly from the circumferentially outer border of the Belleville spring.

4. The friction disc clutch of claim 3, wherein the inner friction plate has a radially inner edge formed with internal splines; an inner hub on the shaft, the inner hub having an exterior with external splines which engage the internal splines of the inner friction plate, and the splines are oriented to enable relative axial motion of the inner friction plate with respect to the shaft.

5. The friction disc clutch of claim 4, wherein a radial safety clearance space is defined between the radially inner edge of each Belleville spring and the external splines of the hub.

6. The friction disc clutch of claim 2, wherein the centering surface of the outer friction plate has an inner diameter and the Belleville spring has an outer diameter, and the inner diameter of the centering surface is slightly smaller than the outer diameter of the Belleville spring before insertion of the Belleville spring against the centering surface.

7. The friction disc clutch of claim 6, wherein the friction surfaces on the inner friction plate have radially inner edges and the inner diameter of the centring surface is smaller than the inner diameter of the radially inner edge of the friction surface.

8. The friction disc clutch of claim 6, wherein the Belleville spring has an axial length in its nontensioned condition and a reduced axial length when the spring is in a tensioned condition with the first and second clutch halves engaged; the axial length of the Belleville spring in the nontensioned condition is substantially identical to the distance between the respective surfaces on the outer and inner friction plates which the radially inner and outer edge regions of the Belleville spring seek to engage when the first and second clutch halves of the clutch are disengaged.

9. The friction disc clutch of claim 2, wherein the inner friction plate has a radially inner edge formed with internal splines; an inner hub on the shaft, the inner hub having an exterior with external splines which engage the internal splines of the inner friction plate, and the splines are oriented to enable relative axial motion of the inner friction plate with respect to the shaft.

10. The friction disc clutch of claim 1, wherein the first actuating element comprises a hydraulically operated piston, which is hydraulically operated for moving the outer and inner friction plates together.

11. The friction disc clutch of claim 10, wherein the second actuating element comprises a compression spring, which is compressed upon operation of the first actuating element and is permitted to decompress and move the friction plates apart when the first actuating element is not operating.

12. The friction disc clutch of claim 1, wherein the first clutch half comprises a first plurality of the outer friction plates, the second clutch half comprises a second plurality of the inner friction plates, and wherein there is a respective inner friction plate between each pair of outer friction plates;

the first actuating element engaging the outer and inner friction plates and the second actuating element releasing all of the outer and inner friction plates; each inner friction plate having respective friction surfaces disposed on opposite second axial sides for engaging first axial sides of each of the respective pair of the outer friction plates when the first and second clutch halves are engaged;

a plurality of the Belleville spring resilient disengaging members being disposed at each opposite second axial side of each of the inner friction plates, and the radially inner border of each Belleville spring engaging the respective inner friction plate while the radially outer border of the Belleville spring engages the axially adjacent outer friction plate.

13. The friction disc clutch of claim 1, wherein the Belleville spring has radial slots extending radially inwardly from the circumferentially outer border of the Belleville spring.

14. The friction disc clutch of claim 1, wherein the sliding surface at the radially inner border of the Belleville spring is curved in shape, curved toward the respective inner friction plate which the Belleville spring engages.

15. The friction disc clutch of claim 1, wherein the belleville spring has an axial length in its nontensioned condition and a reduced axial length when the spring is in a tensioned condition with the first and second clutch halves engaged; the axial length of the Belleville spring in the nontensioned condition is substantially identical to the distance between the respective surfaces on the outer and inner friction plates which the radially inner and outer edge regions of the Belleville spring seek to engage when the first and second clutch halves of the clutch are disengaged.

* * * * *